United States Patent
Pfeiffer

(10) Patent No.: US 11,872,917 B2
(45) Date of Patent: Jan. 16, 2024

(54) VEHICLE SEAT WITH A VENTILATION DEVICE WHICH COMPRISES AT LEAST TWO FANS

(71) Applicant: Volkswagen Aktiengesellschaft, Wolfsburg (DE)

(72) Inventor: Sascha Alexander Pfeiffer, Beetzendorf (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 472 days.

(21) Appl. No.: 17/322,263

(22) Filed: May 17, 2021

(65) Prior Publication Data

US 2021/0268947 A1 Sep. 2, 2021

Related U.S. Application Data

(63) Continuation of application No. PCT/EP2019/081286, filed on Nov. 14, 2019.

(30) Foreign Application Priority Data

Nov. 15, 2018 (DE) ..................... 10 2018 219 495.5

(51) Int. Cl.
*B60N 2/56* (2006.01)
*B60N 2/90* (2018.01)
(Continued)

(52) U.S. Cl.
CPC ............ *B60N 2/5657* (2013.01); *H02P 27/08* (2013.01); *H04L 12/403* (2013.01); *H04L 12/40019* (2013.01)

(58) Field of Classification Search
CPC ...... B60N 2/5635; B60N 2/5685; B60N 2/02; B60N 2/02246; H04L 12/40169; H04L 2012/40273
See application file for complete search history.

(56) References Cited

U.S. PATENT DOCUMENTS 5,902,014 A 5/1999 Dinkel et al.
6,186,592 B1 2/2001 Orizaris et al.
(Continued)

FOREIGN PATENT DOCUMENTS

CN 1813397 A 8/2006
CN 102089170 A 6/2011
(Continued)

OTHER PUBLICATIONS

Chinese Office Action dated Aug. 2, 2022 in corresponding application 201980069518.1.
(Continued)

*Primary Examiner* — Shin H Kim
(74) *Attorney, Agent, or Firm* — Muncy, Geissler, Olds & Lowe, P.C.

(57) ABSTRACT

A vehicle seat with a ventilation device which is paired with at least two fans. It is provided that only one of the at least two fans is provided with a bus signal as an input signal which is converted into a PWM signal for the at least one other fan in a signal converter wherein the signal converter has at least one output which provides the PWM signal, generated for the at least one fan, to an input of the at least one further fan.

4 Claims, 1 Drawing Sheet

State of the Art

(51) Int. Cl.
*H02P 5/68* (2006.01)
*H02P 27/08* (2006.01)
*H04L 12/40* (2006.01)
*H04L 12/403* (2006.01)

(56) References Cited

U.S. PATENT DOCUMENTS

| | | |
|---|---|---|
| 6,619,736 B2 | 9/2003 | Stoewe et al. |
| 6,933,687 B2 | 8/2005 | Makaran et al. |
| 7,567,045 B2 | 7/2009 | Fristedt |
| 10,414,302 B2 | 9/2019 | Petrovski et al. |
| 10,935,960 B2 * | 3/2021 | York .................... G06F 1/20 |
| 11,206,154 B2 * | 12/2021 | Sonnek ............. H04L 12/40078 |
| 11,332,051 B2 * | 5/2022 | Hoshi .................. B60N 2/5678 |
| 11,634,010 B2 * | 4/2023 | Sonnek ............... B60H 1/2218 |
| | | 237/5 |
| 2001/0028185 A1 | 10/2001 | Stowe et al. |
| 2008/0247879 A1 | 10/2008 | De Filippis et al. |
| 2009/0189420 A1 * | 7/2009 | Bohlender .......... B60N 2/5671 |
| | | 219/202 |
| 2009/0192671 A1 * | 7/2009 | Bolender ............. B60N 2/5671 |
| | | 219/202 |
| 2011/0105005 A1 | 5/2011 | Spaggiari |
| 2014/0217785 A1 * | 8/2014 | Arens ................... A47C 7/744 |
| | | 297/180.12 |
| 2016/0029805 A1 * | 2/2016 | Arens ................... A47C 7/748 |
| | | 297/180.12 |
| 2017/0230196 A1 | 8/2017 | Seifert et al. |
| 2020/0062083 A1 * | 2/2020 | Sonnek ............. B60H 1/00778 |
| 2020/0067728 A1 * | 2/2020 | Sonnek ................ H04L 67/561 |
| 2021/0268947 A1 * | 9/2021 | Pfeiffer ................ B60N 2/5657 |
| 2023/0135176 A1 * | 5/2023 | Yang .................... B60N 2/5607 |
| | | 701/36 |

FOREIGN PATENT DOCUMENTS

| | | |
|---|---|---|
| CN | 107107780 A | 8/2017 |
| DE | 19628698 C1 | 10/1997 |
| DE | 19842979 C1 | 12/1999 |
| DE | 19953385 A1 | 5/2001 |
| DE | 102007039422 A1 | 2/2009 |
| EP | 3182607 A1 | 6/2017 |
| WO | WO2004114513 A1 | 12/2004 |
| WO | WO2005101157 A1 | 10/2005 |
| WO | WO2009024226 A2 | 2/2009 |

OTHER PUBLICATIONS

International Search Report dated Feb. 14, 2020 in corresponding application PCT/EP2019/081286.

* cited by examiner

State of the Art

State of the Art

VEHICLE SEAT WITH A VENTILATION DEVICE WHICH COMPRISES AT LEAST TWO FANS

This nonprovisional application is a continuation of International Application No. PCT/EP2019/081286, which was filed on Nov. 14, 2019 and which claims priority to German Patent Application No. 10 2018 219 495.5, which was filed in Germany on Nov. 15, 2018 and which are both herein incorporated by reference.

BACKGROUND OF THE INVENTION

Field of the Invention

The present invention relates to a vehicle seat with a ventilation device which is paired with at least one component of the vehicle seat and which comprises at least two fans.

Description of the Background Art

Electric variable-speed drives, in particular drives for fans, are controlled in a known manner by means of PWM signals (PWM=pulse width modulation) or by means of a LIN bus (LIN=Local Interconnect Network).

Pulse width modulation is primarily used to control loads such as, e.g., motors. In this regard, microcontrollers already have special PWM outputs integrated. In the case of pulse width modulation, pulses with full voltage but variable width are sent to the load. A square wave signal with a constant frequency is thus modulated with a certain duty cycle. A PWM is thus characterized by its frequency and its duty cycle. The advantage of this type of control is that less power is consumed because there is no permanent input voltage that is regulated down to the desired motor voltage by electronics, but the motor is controlled by the width of the switching pulses.

A fan having a fan wheel and a motor for driving the fan wheel is known from the publication DE 20 2015 106 847 U1, wherein the fan has two supply connections for supplying power to the motor and a control input for controlling the motor by means of a control signal. In addition, the fan has a status signal circuit for generating a fan status signal, wherein the status signal circuit is designed to modulate the status signal at one of the two supply connections. The fan further has a circuit which is designed to adjust a motor speed as a function of the control signal, wherein the circuit is further designed for processing PWM (pulse width modulation) pulses of the control signal or for processing a DC voltage signal of the control signal.

A local interconnect network (LIN), also called LIN bus, is a serial communication system for networking sensors and actuators. Thus, the LIN bus is mostly used in the comfort sector to control servomotors. The bus architecture allows the necessary bus logic to be easily mapped to hardware. Many microcontrollers are thus able to operate a LIN bus with the UART or SCI interface. Communication on the LIN bus follows the master-slave principle. A master initiates the communication with one or more slaves, in particular multiple fans or the like. The communication on the bus can only take place if a master is connected. It causes the configured slaves to send their data one after the other.

SUMMARY OF THE INVENTION

It is therefore an object of the present invention to provide a vehicle seat with a ventilation device which is paired with at least two fans. It is provided that only one of the at least two fans is provided with a bus signal as an input signal which is converted into a PWM signal for the at least one other fan in a signal converter wherein the signal converter has at least one output which provides the PWM signal, generated for the at least one fan, to an input of the at least one further fan.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
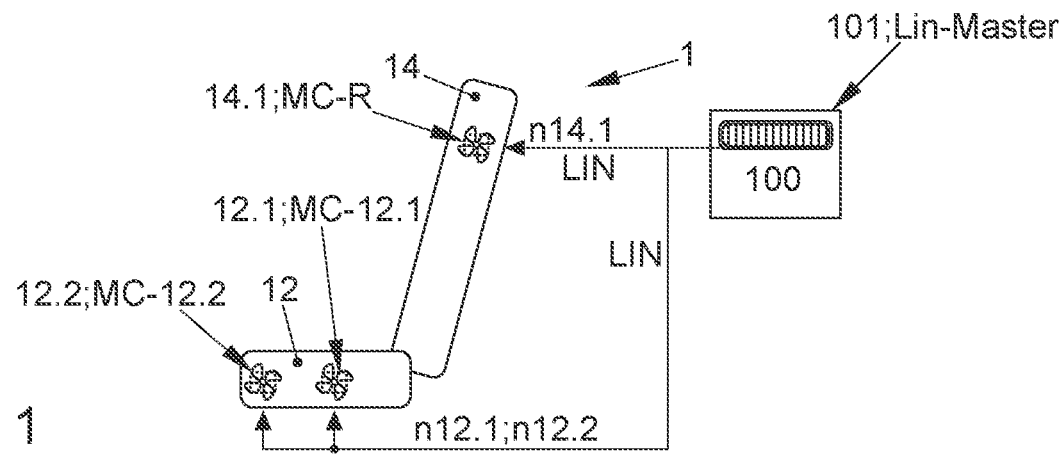
FIG. 1 shows a connection of fans to a central control device according to the state of the art in a first embodiment variant.

In a first conventional embodiment variant, FIG. 1 shows a control device 100 as part of an on-board network of a vehicle and a first 12.1 and second fan 12.2 in a seat part 12 of a vehicle seat 1. Vehicle seat 1 further comprises a backrest 14 with a further fan 14.1.

Fans 12.1, 12.2, and 14.1 are controlled by central control device 100 via BUS signals, in particular LIN bus signals, which are transmitted to fans 12.1, 12.2, and 14.1 according to the master-slave principle. LIN master 101 is assigned to control device 100.

By reading in the master-side signal in the respective LIN signals, associated with slave-side fans 12.1, 12.2, and 14.1, in fans 12.1, 12.2, in each case a pulse-width-modulated fan control signal is generated from the LIN signals via relatively complex control electronics MC-12.1, MC-12.2, MC-14.1, disposed in fans 12.1, 12.2, to a so-called PWM controller, in particular a microchip controller, so that the desired fan speeds n12.1, n12.2, or n14.1 of fans 12.1, 12.2, and 14.1, respectively, can be generated by the (pulse-width-modulated) fan control signals.

Fans 12.1, 12.2 in seat part 12 can have the same speeds n12.1=n12.2 or different speeds n12.1≠n12.2.

It is understood that the speeds of seat-part-side fans n12.1, n12.2 can be controlled to be the same as or different from speed n14.1 of fan 14.1 in backrest 14. It is particularly clear that each of the fans 12.1, 12.2, and 14.1 requires the relatively complex electronics MC-12.1, MC-12.2, MC-14.1 and the named LIN bus components 101.

In summary, it was ascertained that the electronics for generating the PWM signals for regulating the speed of the individual fans 12.1, 12.2, and 14.1 are disposed integrated in fans 12.1, 12.2, and 14.1.

Figure 2:
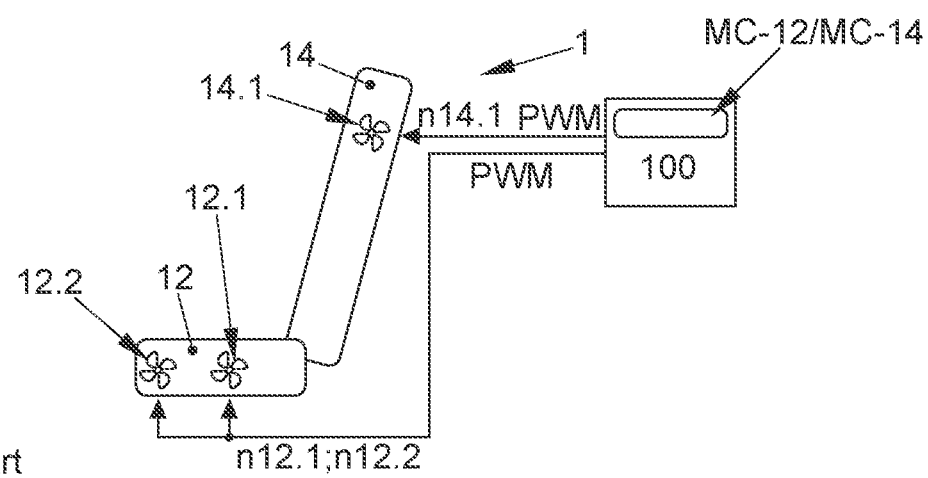
FIG. 2 shows a connection of fans to a central control device according to the state of the art in a second embodiment variant.

In a second conventional embodiment variant, in analogy to FIG. 1, FIG. 2 shows a control device 100 as part of an on-board network of a vehicle and a first fan 12.1 and a second fan 12.2 in a seat part 12 of a vehicle seat 1. Vehicle seat 1 further comprises a backrest 14 with a further fan 14.1 located in backrest 14.

In this second embodiment variant, fans 12.1, 12.2, and 14.1 are not controlled via BUS signals from central control device 100.

The seat-part-side fans 12.1, 12.2 and the backrest-side fan 14.1 are controlled via a PWM control in control device 100. A control module MC-12/MC-14 is disposed in control device 100, which already generates PMW output signals for the desired speed n14.1 of fan 14.1 in backrest 14 and a PMW output signal for the desired speed n12.1, n12.2 of fans 12.1, 12.2 in seat part 12. It is understood that the speed n12.1, n12.2 of the seat-part-side fans 12.1 and 12.2 can be the same as (n12.1, n12.2=n14.1) or different from (n12.1, n12.2≠n14.1) the speed n14.1 of fan 14.1 in backrest 14. Because only one PMW output signal is output for the seat-part-side fans and via a node, shown in FIG. 2, for fans 12.1 and 12.2 connected in parallel, seat-part-side fans 12.1 and 12.2 are supplied with the same PMW output signal and seat-part-side fans 12.1 and 12.2 are controlled (provided that the design is the same) with the same speed n12.1=n12.2.

It is understood that multiple PMW output signals without the node shown in FIG. 2 can also be generated for the seat-part-side fans and output to fans 12.1 and 12.2, so that the seat-part-side fans 12.1 and 12.2 (provided that the design is the same) can be controlled or driven at different speeds n12.1≠n12.2.

In summary, it was ascertained that the electronics for generating the PWM signals for regulating the speed of the individual fans 12.1, 12.2, and 14.1 in this second embodiment variant are disposed not in fans 12.1, 12.2, and 14.1, but as control modules MC-12, MC-14 in control device 100.

In this embodiment variant, however, central control device 100, which has the module MC-12/MC-14 for the PWM control in control device 100, exceeds the first embodiment variant shown and described in FIG. 1 in terms of cost, so that no savings can be achieved. Because standard control devices 100 also have this module for PWM control when the vehicle possibly does not have any fans in vehicle seat 1, this cost effect is disadvantageously amplified. Because a relatively low installation rate of vehicle seats with more than one fan per seat part 12 and/or backrest 14, therefore with two fans 12.1, 12.2 in the seat part and/or in backrest 14, is to be expected, this solution likewise does not appear to be optimal.

The invention is now based on the object of creating a cost-effective connection of fans to a control device, which allows a simple control of multiple fans. In other words, multiple fans are to be connected—controllably—to a control device as cost-effectively as possible.

The starting point of the invention is a vehicle seat with a ventilation device which is paired with at least two fans.

According to the invention, it is provided that only one of the at least two fans is provided with a bus signal as an input signal, which is converted into a PMW signal for the at least one further fan in a signal converter, wherein the signal converter has at least one output which provides the PWM signal, generated for the at least one fan, to an input of the at least one further fan.

It is preferably provided that the bus signal is a LIN bus signal, which is formed by a bus master in a control device, which is made available as an input signal solely to an input of a signal converter of the one fan configured as a slave.

It is preferably provided further that the at least one component is a seat part or a backrest, wherein the at least two fans are disposed a) together in the seat part or b) together in the backrest or c) one fan in the seat part and the further at least one fan, separately from the seat part, in the backrest.

A vehicle seat is preferably designed in which the component is the seat part, wherein one (first fan) of the at least two fans is disposed in a seat cushion of the seat part and the further fan (second fan) is disposed in a seat-depth-adjustable seat cushion of the seat part of the vehicle seat, so that a vehicle seat is designed with a ventilation device in the seat part, wherein only one of the at least two fans is provided with a bus signal as an input signal, which is converted into a PMW signal for the at least one fan in the signal converter, wherein the signal converter has at least one output which provides the PWM signal, generated for the at least one fan, to an input of the at least one further fan.

Figure 3:
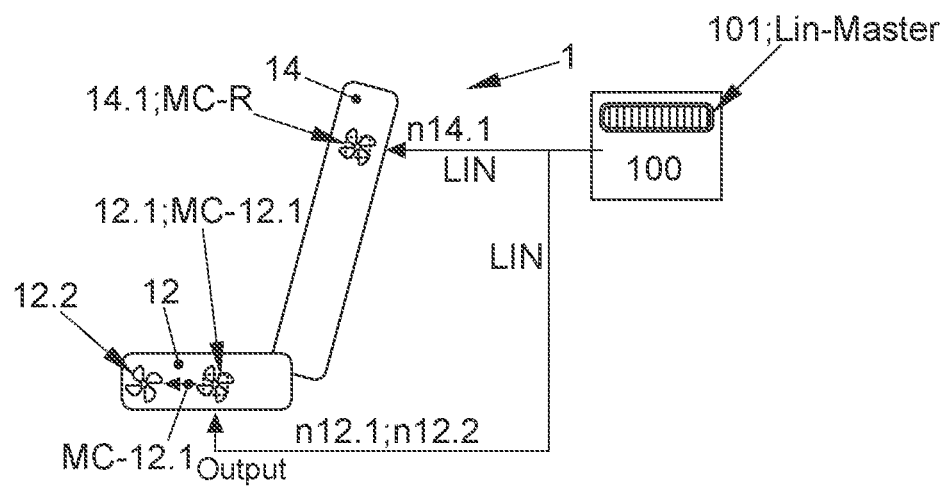
FIG. 3 shows a connection of fans to a central control device in an embodiment according to the invention.

The invention will be explained in more detail with use of FIG. 3:

FIG. 3 shows a connection of fans to a central control device in an embodiment according to the invention.

FIG. 3 shows the embodiment of the invention for connecting vehicle-seat-side fans 12.1, 12.2, and 14.1 to a central control device 100.

The invention is essentially based on the first conventional embodiment variant.

Control device 100 as part of an on-board network of a vehicle and a first 12.1 and second fan 12.2 are again disposed in a seat part 12 of a vehicle seat 1. Vehicle seat 1 again comprises a backrest 14 with a further fan 14.1.

Fans 12.1, 12.2, and 14.1 according to the invention are controlled by central control device 100 via BUS signals, in particular LIN bus signals, which are transmitted to fans 12.1, 12.2, and 14.1 according to the master-slave principle. LIN master 101 is assigned to control device 100. This has the advantage that the distances to the fans 12.1, 12.2, and 14.1 can always be realized using a bus cable that is insensitive to interference. The digital LIN bus signals are advantageously insensitive to interference, wherein the LIN bus cable also generates less interference than a long cable transmitting PWM signals. Long lines over which PWM signals are transmitted according to the second embodiment variant should rather be avoided because they emit electromagnetic radiation which can interfere with other electronic components, in particular those that work with antenna and amplifier technology.

In particular in the event that more than one fan is disposed in a component 12 and/or 14 of the vehicle seat, it is proposed to supply only one of the at least two fans 12.1, 12.2 with a slave-side LIN bus signal from LIN master 101 of control device 100. Only one bus cable is therefore required and installed between control device 100 and the respective component 12, 14, which also saves material costs.

In addition, it is assumed according to the invention that the at least two fans 12.1, 12.2 in the seat part 12 in the exemplary embodiment can be controlled and operated with the same PWM signal n12.1=n12.2.

In other words, it was recognized that under this condition there is no need for a separate evaluation of the input-side LIN bus signals in both fans 12.1, 12. and it was recognized that it is sufficient to generate a single PWM signal in a single PWM controller MC-12.1 without resulting in restrictions of the desired functionality of the ventilation system.

Thus, in contrast to the first embodiment variant, only one of the two fans 12.1 or 12.2 is assigned a PWM microchip controller MC-12.1 or MC-12.2, which evaluates a single input-side LIN bus signal for the one fan 12.1, 12.2 and converts it into the PMW signal of the one fan 12.1 or 12.2.

It was found particularly according to the invention that seat part 12 has, for example, a fan 12.1 for ventilating the foam of the seat cushion of seat part 12 and a fan 12.2 for ventilating the foam of a further seat cushion of seat part 12, which is associated with a separate seat depth adjustment of seat part 12. It is provided in this case that fans 12.1 and 12.2 are controlled with the same PWM signal.

This now results in the essential advantage that by reading in a signal in one of the fans 12.1 or 12.2, the PWM control is generated as an input-side signal for the speed of fan 12.1 or 12.2, which is provided by the respective PWM microchip controller MC-12.1 or MC-12.2 additionally as an output signal and is provided, and is therefore output, to the respective other fan 12.1 or 12.2 in the exemplary embodiment to fan 12.2. This means that second fan 12.2 advantageously does not need its own PWM microchip controller MC-12.2. Because fans 12.1, 12.2 are controlled with the same PWM signal (without both fans 12.1, 12.2 having their own cost-intensive electronics), the desired saving in material results in an advantageous manner.

Although fans 12.1 and 12.2 are controlled with the same PWM signal, there is still the possibility of designing the air distribution of the ventilation system in both areas of seat part 12 to be uniform or different. The areas refer to the area, to be ventilated, of the main seat cushion of seat part 12 and the area, to be ventilated, of the seat-depth-adjustable seat cushion of seat part 12, wherein the areas generally have different outflow areas.

Provided that the same PWM signal provided according to the invention is present, the skilled artisan advantageously selects two fans 12.1 and 12.2, which, depending on the outflow area, to be ventilated, of the main seat cushion of seat part 12 and of the seat-depth-adjustable seat cushion, bring about the desired uniform or nonuniform ventilation. In this case, the skilled artisan can ensure that the same or different amounts of air are generated depending on the design of fan 12.1, 12.2. It is thus possible that with the same PWM control, that is, when the same PWM signal is applied to the first and second fan 12.1, 12.2, a uniform air distribution is guaranteed, although there are different fan speeds that are operated at the corresponding fan power. In other words, according to the invention, only the applied PWM signal of fans 12.1, 12.2 is thus necessarily the same, because fans 12.1, 12.2 1 can be of the same or different designs.

The aim is mostly to produce a uniform, planar air distribution in the two seat cushions of seat part 12, the main seat cushion of seat part 12 and the seat-depth adjustable seat cushion of seat part 12, in order to achieve a uniform feeling of comfort for a person sitting thereon. As a rule, the second fan 12.2 of the seat-depth-adjustable seat cushion of seat part 12 is then selected such that the air throughput (air volume $m^3$/per surface area $m^2$) is adapted to the air throughput (air volume $m^3$/per surface area $m^2$) of the main seat cushion of seat part 12. With a smaller outflow area in $m^2$ of the seat-depth-adjustable seat cushion of seat part 12, second fan 12.2 is thus selected such that a smaller air volume in $m^3$ is generated with the available input signal 12.2, which corresponds to the output signal MC-12.1$_{Output}$ of first fan 12.1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle seat comprising:
   at least two fans; and
   a ventilation device paired with at the least two fans, only one of the at least two fans being provided with a bus signal as an input signal, which is converted into a PWM signal for the at least one further fan in a signal converter,
   wherein the signal converter has at least one output that provides the PWM signal generated for the at least one fan to an input of the at least one further fan.

2. The vehicle seat according to claim 1, wherein the bus signal is a LIN bus signal, which is formed by a bus master in a control device, which is made available as an input signal solely to an input of a signal converter of the one fan configured as a slave.

3. The vehicle seat according to claim 1, wherein the at least one component is a seat part or a backrest, wherein the at least two fans are disposed together in the seat part or together in the backrest or one fan in the seat part and the further at least one fan, separately from the seat part, in the backrest.

4. The vehicle seat according to claim 1, wherein the component is the seat part, wherein one of the at least two fans is disposed in a seat cushion of the seat part and the further fan is disposed in a seat-depth-adjustable seat cushion of the seat part of the vehicle seat, so that a vehicle seat is designed with a ventilation device in the seat part, wherein only one of the at least two fans is provided with a bus signal as an input signal, which is converted into a PWM signal for the at least one fan in a signal converter, wherein the signal converter has at least one output which provides the PWM signal generated for the at least one fan to an input of the at least one further fan.

* * * * *